(12) United States Patent
Snyder (10) Patent No.: US 6,932,303 B2
(45) Date of Patent: Aug. 23, 2005

(54) CLAMP COVER

(75) Inventor: Darryl L. Snyder, Canton, OH (US)

(73) Assignee: Snyder National Corporation, Canton, OH (US)

( * ) Notice: Subject to any disclaimer, the term of this patent is extended or adjusted under 35 U.S.C. 154(b) by 0 days.

(21) Appl. No.: 10/702,666

(22) Filed: Nov. 6, 2003

(65) Prior Publication Data

US 2004/0108420 A1 Jun. 10, 2004

Related U.S. Application Data (60) Provisional application No. 60/432,209, filed on Dec. 10, 2002.

(51) Int. Cl.[7] .............................. F16L 3/13; F16L 3/14; E04F 19/08
(52) U.S. Cl. ............................ 248/58; 248/62; 248/73; 52/718.04; 52/220.5
(58) Field of Search .................... 52/718.04, 718.06, 52/220.5; 248/73, 58, 59, 60, 61, 62, 63, 67.5, 67.7, 72, 74.5

(56) References Cited

U.S. PATENT DOCUMENTS

| | | | |
|---|---|---|---|
| 2,762,398 A | | 9/1956 | Adam |
| 3,297,001 A | | 1/1967 | Locke et al. |
| 3,486,726 A | * | 12/1969 | Kindorf et al. ............... 248/72 |
| 3,656,515 A | | 4/1972 | Wogerbauer et al. |
| 4,534,147 A | * | 8/1985 | Cristell ..................... 52/288.1 |
| 4,629,826 A | | 12/1986 | Thomas |
| 4,720,953 A | * | 1/1988 | Onishi et al. ................. 174/48 |
| 4,901,957 A | * | 2/1990 | Daigle et al. ................. 248/62 |
| 4,979,711 A | | 12/1990 | McIlroy |
| 5,024,614 A | * | 6/1991 | Dola et al. ................... 439/114 |
| D339,641 S | | 9/1993 | Leufstedt et al. |
| 5,243,800 A | * | 9/1993 | Olbrich ..................... 52/287.1 |
| D340,110 S | | 10/1993 | Reed et al. |
| 5,274,194 A | * | 12/1993 | Belcher ...................... 174/50 |
| 5,732,747 A | | 3/1998 | Holliday |
| 5,908,179 A | | 6/1999 | Fimbres |
| D430,543 S | | 9/2000 | Rohder |
| D436,163 S | | 1/2001 | Peterson et al. |
| 6,191,363 B1 | * | 2/2001 | Samuels ..................... 174/68.3 |
| D443,198 S | | 6/2001 | Snyder |
| D457,052 S | | 5/2002 | Snyder |
| 6,469,250 B1 | * | 10/2002 | Decore et al. ................. 174/95 |
| D472,456 S | | 4/2003 | Snyder |

FOREIGN PATENT DOCUMENTS

DE         40 32 473 A1 * 2/1992

* cited by examiner

*Primary Examiner*—Jonathon Szumny
(74) *Attorney, Agent, or Firm*—Zollinger & Burleson Ltd.

(57) ABSTRACT

A cover having first and second halves is used in combination with clamps to cover elongated items such as wires and pipes. The first and second halves cooperate together to form a cavity that receives the elongated items and clamps. The halves may be formed with identical cross sections so that they may be fabricated from a single mold. The halves may snap together or be connected with a fastener. Each cover half includes a pair of opposed locking ledges that form slots sized to receive the opposed feet of the clamp. The clamps are installed by angling the clamps with respect to the longitudinal axis of the cover and pressing the clamp against the base wall of the cover. The clamp is then twisted to a position substantially perpendicular to the longitudinal axis of the cover. The twisting motion simultaneously moves the feet of the clamp under the locking ledges of the clamp cover.

11 Claims, 7 Drawing Sheets

CLAMP COVER

CROSS REFERENCE TO RELATED APPLICATIONS

This application claims priority from U.S. Provisional Application Ser. No. 60/432,209, filed Dec. 10, 2002; the disclosures of which are incorporated herein by reference.

BACKGROUND OF THE INVENTION

1. Technical Field

The present invention generally relates to a conduit and, more particularly, a conduit that accommodates and covers clamps. Specifically, the present invention relates to a cover or conduit that is configured to receive a clamp that holds lengths of wires or tubing.

2. Background Information

When a central air conditioning unit is added to an older house, the line set for the heat exchanger may have to be installed across a finished basement room. Ideally, the line set can be hidden above a ceiling or behind a piece of molding. In some situations, hiding the line set is impossible and the homeowner will have the line set extending across the top of a wall in a finished room in a basement. The homeowner and contractor desire to have a cover member or conduit that can aesthetically hide the line set. The same problem is encountered during home networking when computer wires extend from room to room or place to place. Home theaters also require wire runs for the surround sound speakers. All of these applications create the problem of unsightly wires.

BRIEF SUMMARY OF THE INVENTION

The present invention provides a cover that may be used to aesthetically cover lengths of tubing or wire such as line sets. The cover accommodates clamps that hold the tubes or wires within the cover. The cover includes first and second halves that cooperate together to surround the clamps. The halves have identical cross sections so that they may be fabricated from a single mold. In one embodiment, the invention provides cover halves that snap together. In another embodiment, a fastener is used to hold the halves together.

In one embodiment, the invention provides a clamp covers that holds the clamps within the cover by the feet of the clamps. The feet are frictionally held in oppositely facing slots formed in opposed corners of the cover. The invention also provides a method of installing the clamps. The clamps are installed by angling the clamps with respect to the longitudinal axis of the cover and pressing the clamp against the base wall of the cover. The clamp is then twisted to a position substantially perpendicular to the longitudinal axis of the cover. The twisting motion simultaneously moves the feet of the clamp under the locking ledges of the clamp cover.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
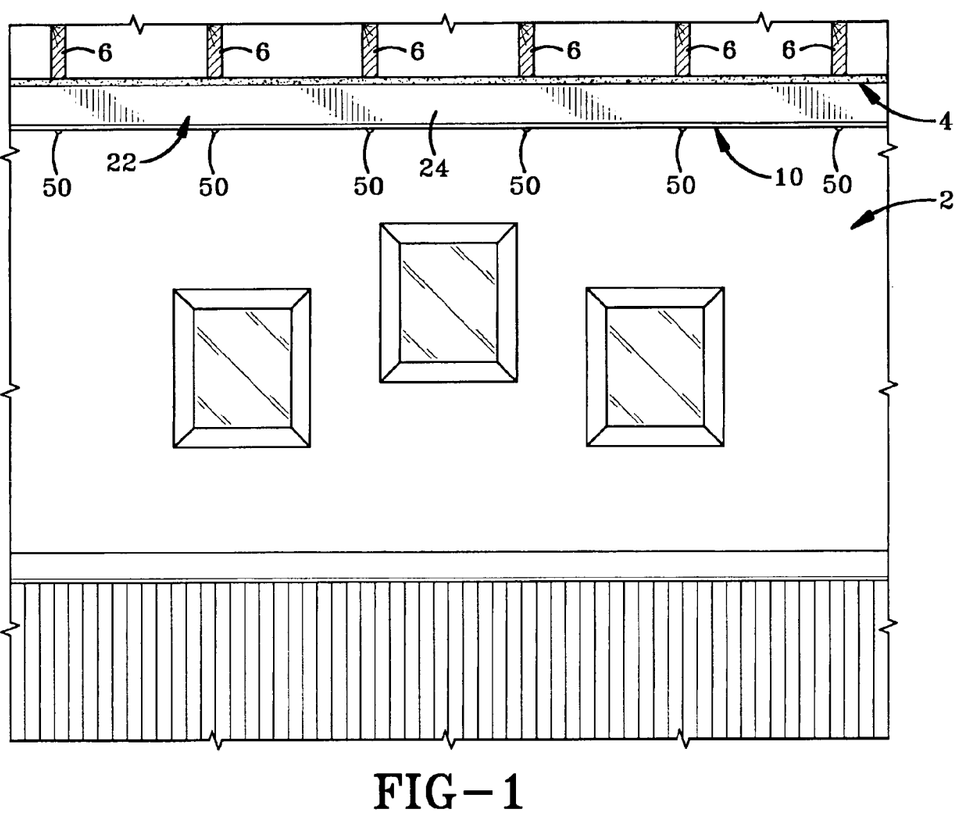
FIG. 1 is a front elevation view of a wall with the cover of the present invention disposed across the top of the wall.

A wall 2 of a typical room is depicted in FIG. 1. The ceiling 4 is depicted in section with each of the floor joists 6 running perpendicular to the direction of cover 10 of the present invention. In the room depicted in FIG. 1, the homeowner or contractor had to run a set of tubing or wiring in a direction substantially perpendicular to joists 6 and could not easily position the tubing or wiring above ceiling 4. Ceiling 4 may be a dry-walled ceiling or may be a ceiling that is difficult to remove and reinstall. If the contractor were to install the tubing or wiring above ceiling 4, each joist 6 would have to be drilled or notched to accommodate the wiring or tubing. Cover 10 of the present invention allows the wiring or tubing to be installed below ceiling 4 at the top of wall 2 in an aesthetically-pleasing fashion.

Figures 2, 3, 4:
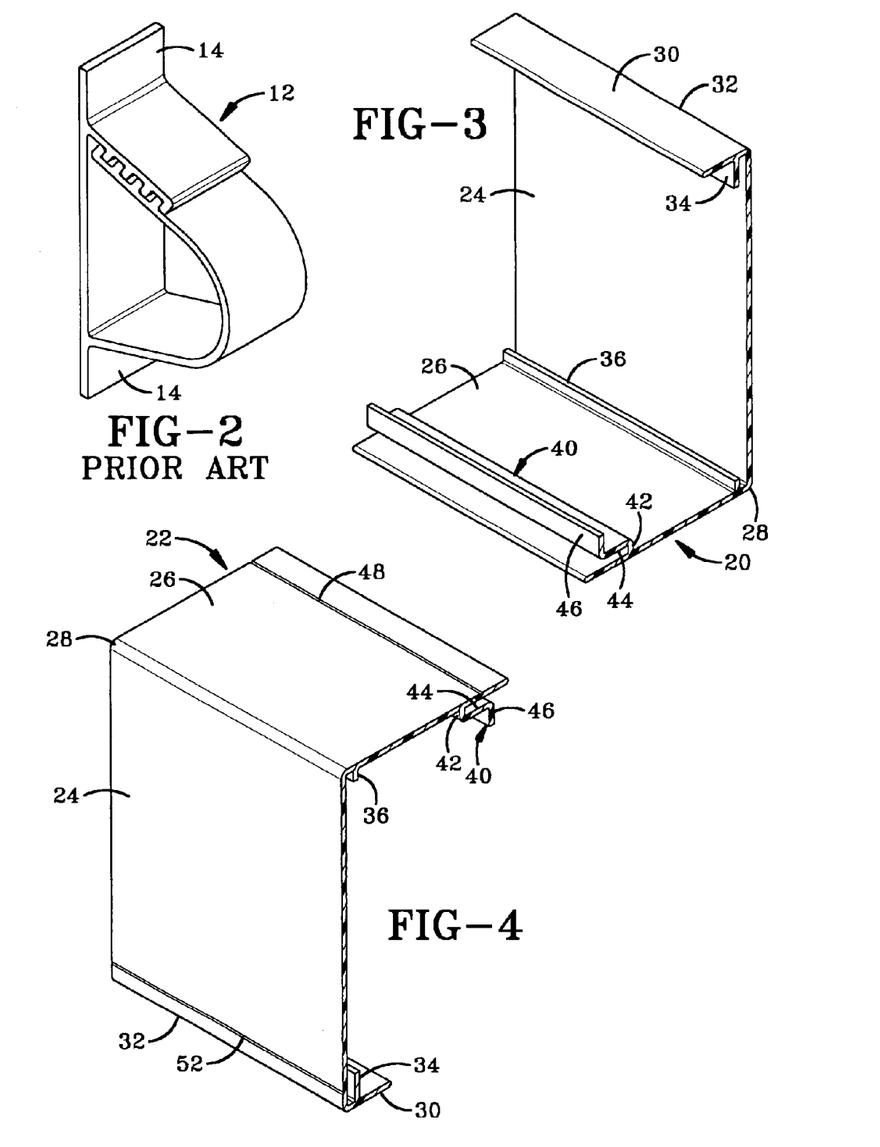
FIG. 2 is a perspective view of a prior art clamp.
FIG. 3 is a perspective view of the first half of the cover showing the inside surfaces.
FIG. 4 is a perspective view of the second half of the cover showing the outside surfaces.

Cover 10 is configured to accommodate the prior art clamps 12 that are commonly used to hold tubing or wiring. Prior art clamp 12 is depicted in FIG. 2 and is disclosed in U.S. Pat. No. 6,079,674, the disclosures of which are incorporated herein by reference to disclose all of the elements and the function of clamp 12. Clamp 12 includes opposed feet 14 that are used to mount clamp 12 to a support. Feet 14 are also used to mount clamp 12 to cover 10.

Cover 10 includes a first half 20 (FIG. 3) and a second half 22 (FIG. 4) that fit together around clamp 12 to hide clamp 12 from view and to hide the tubing or wiring supported by clamp 12 from view. First half 20 and second half 22 have identical cross sections so that halves 20 and 22 may be fabricated from the same extrusion mold. In other embodiments of the invention, halves 20 and 22 may be fabricated with different cross sections.

In the embodiment of the invention wherein each half 20 and 22 has identical cross sections, each half 20 and 22 includes a base wall 24 and a sidewall 26. Base wall 24 and sidewall 26 are substantially perpendicular to one another and are joined at a corner 28. At the end of base wall 24 opposite corner 28, a first flange 30 extends substantially perpendicularly from base wall 24 in the same direction as sidewall 26. The junction between flange 30 and base wall 24 is referred to as a second corner 32. A first clamp locking ledge 34 extends out from first flange 30 in a direction substantially parallel to base wall 24 to form a locking slot. First clamp locking ledge 34 is spaced above the upper surface of base wall 24 a distance slightly larger than the thickness of foot 14 so that foot 14 of clamp 12 may slide below first clamp locking ledge 34. The arrangement may provide for a frictional fit between foot 14 and ledge 34. A second clamp locking ledge 36 projects outwardly from sidewall 26 adjacent corner 28. Second clamp locking ledge 36 is substantially parallel to base wall 24 and spaced from base wall 24 similar to first clamp locking ledge 34. This forms another locking slot. The width of first clamp locking ledge 34 is greater than the width of second clamp locking ledge 36.

Figure 11:
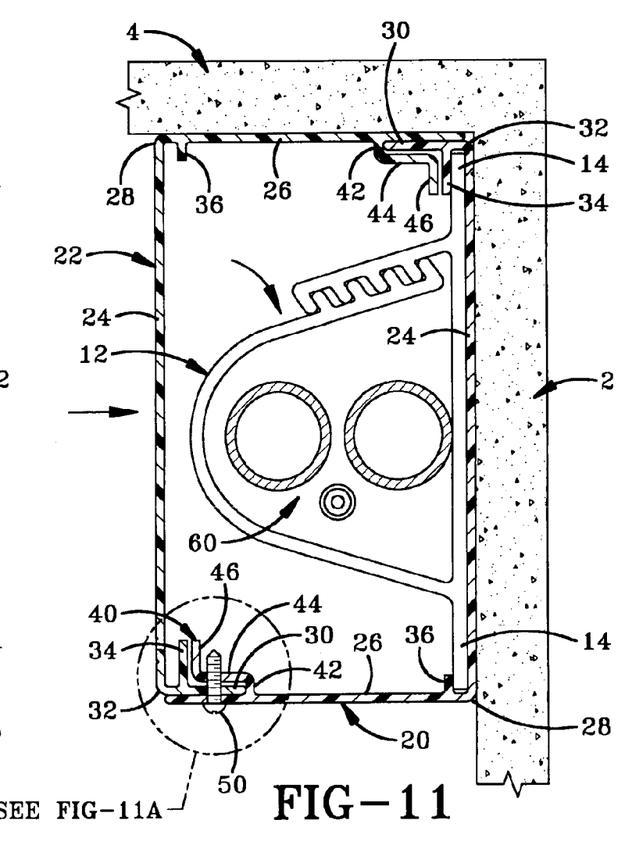
FIG. 11 is a view similar to FIG. 9 showing the clamp in the closed position with the second cover member installed.
Figure 11A:
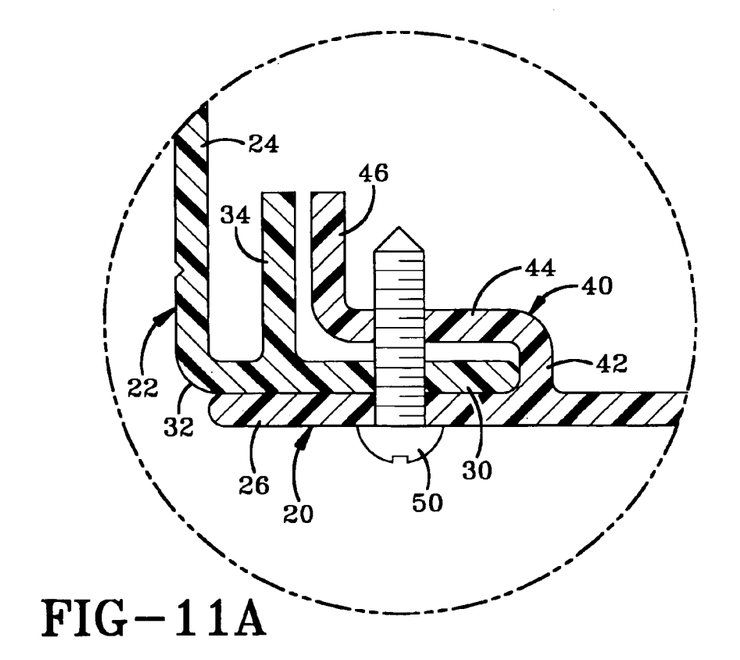
FIG. 11A is an enlarged view of the encircled portion of FIG. 11.

A locking channel 40 extends out from sidewall 26 at the end of sidewall 26 opposite corner 28. Locking channel 40 includes first 42, second 44, and third 46 walls that are configured to cooperate with flange 30 and first clamp locking ledge 34 to lock halves 20 and 22 together. As such, wall 42 has a height sufficient to space second wall 44 from sidewall 26 a distance to receive the projecting portion of first flange 30 that projects above first clamp locking ledge 34. This configuration may be seen in FIGS. 11 and 11A. Third wall 46 projects outwardly from the end of second wall 44 opposite first wall 42. Third wall 46 has a height that causes it to end flush with the end of first clamp locking ledge 34 as depicted in FIG. 11A. Sidewall 26 defines a notch 48 adapted to help the user properly position a fastener 50 such as a screw to hold first 20 and second 24 halves together. Base wall 24 defines a similar notch 52 adjacent first clamp locking ledge 34.

Figure 5:
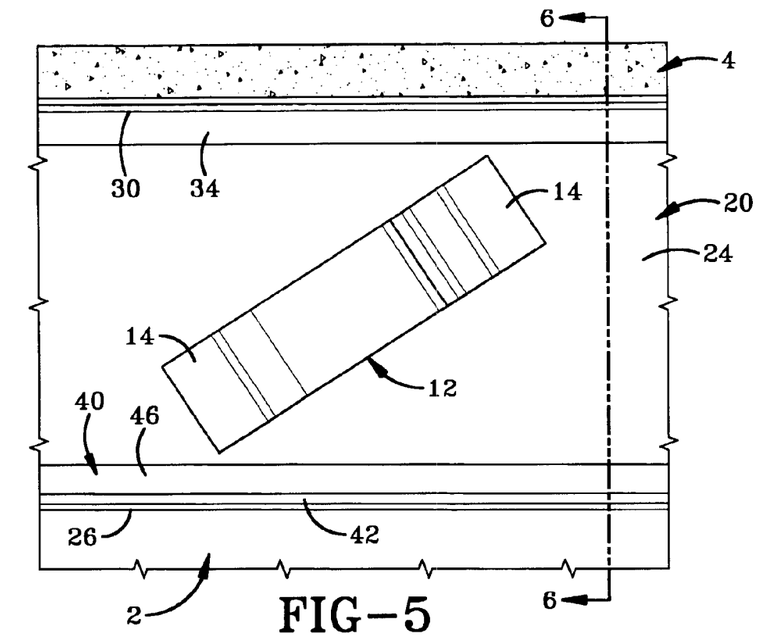
FIG. 5 is a top plan view of the first half of the cover showing the clamp in a position where it is ready to be installed.
Figure 6:
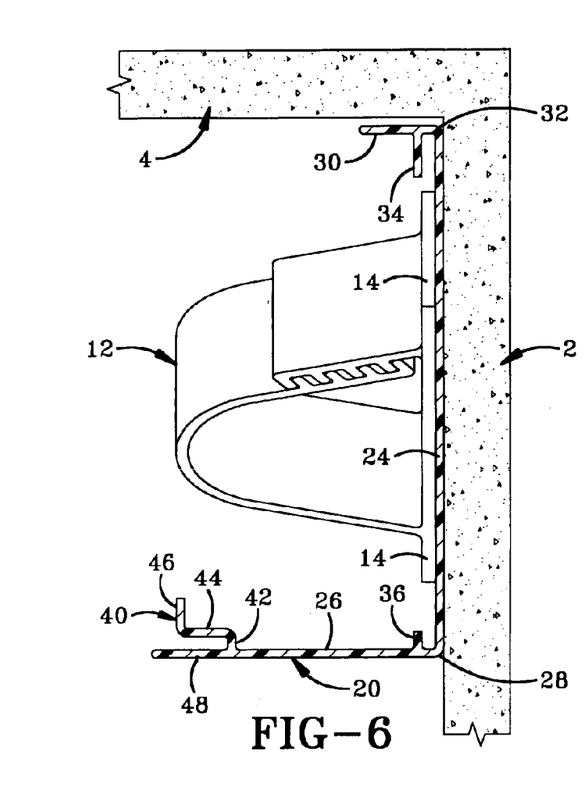
FIG. 6 is a section view taken along line 6—6 of FIG. 5.
Figure 7:
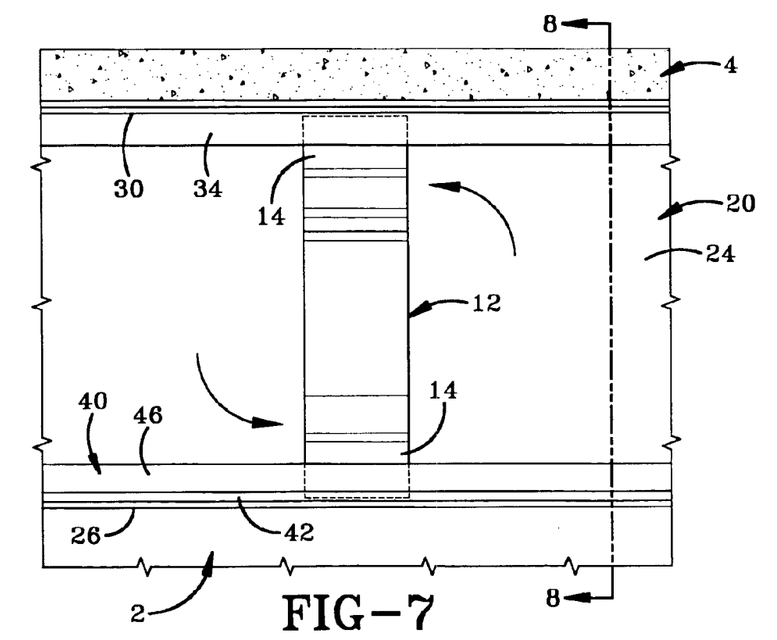
FIG. 7 is a view similar to FIG. 5 showing the clamp in the installed position.
Figure 8:
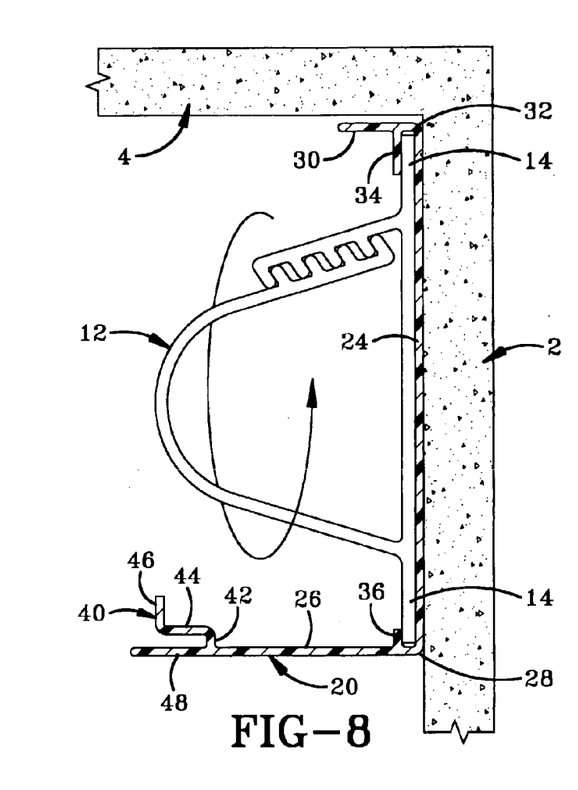
FIG. 8 is a section view taken along line 8—8 of FIG. 7.
Figure 9:
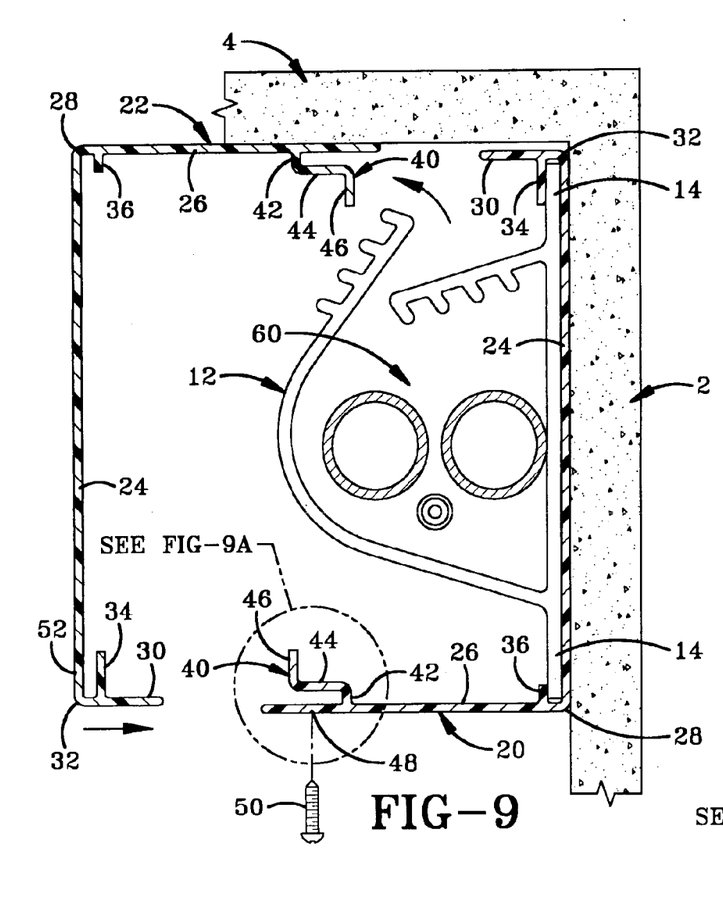
FIG. 9 is a view similar to FIG. 8 showing wire and tubing being positioned in the clamp disposed in the cover.
Figure 9A:
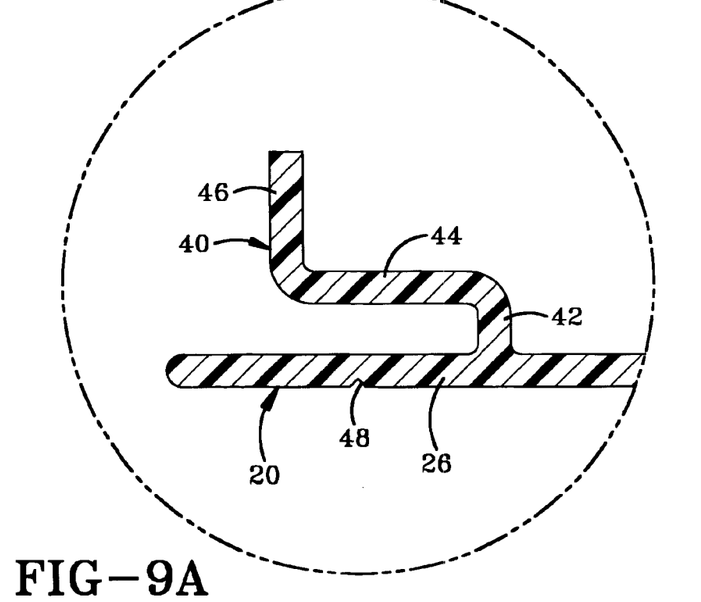
FIG. 9A is an enlarged view of the encircled portion of FIG. 9.
Figure 10:
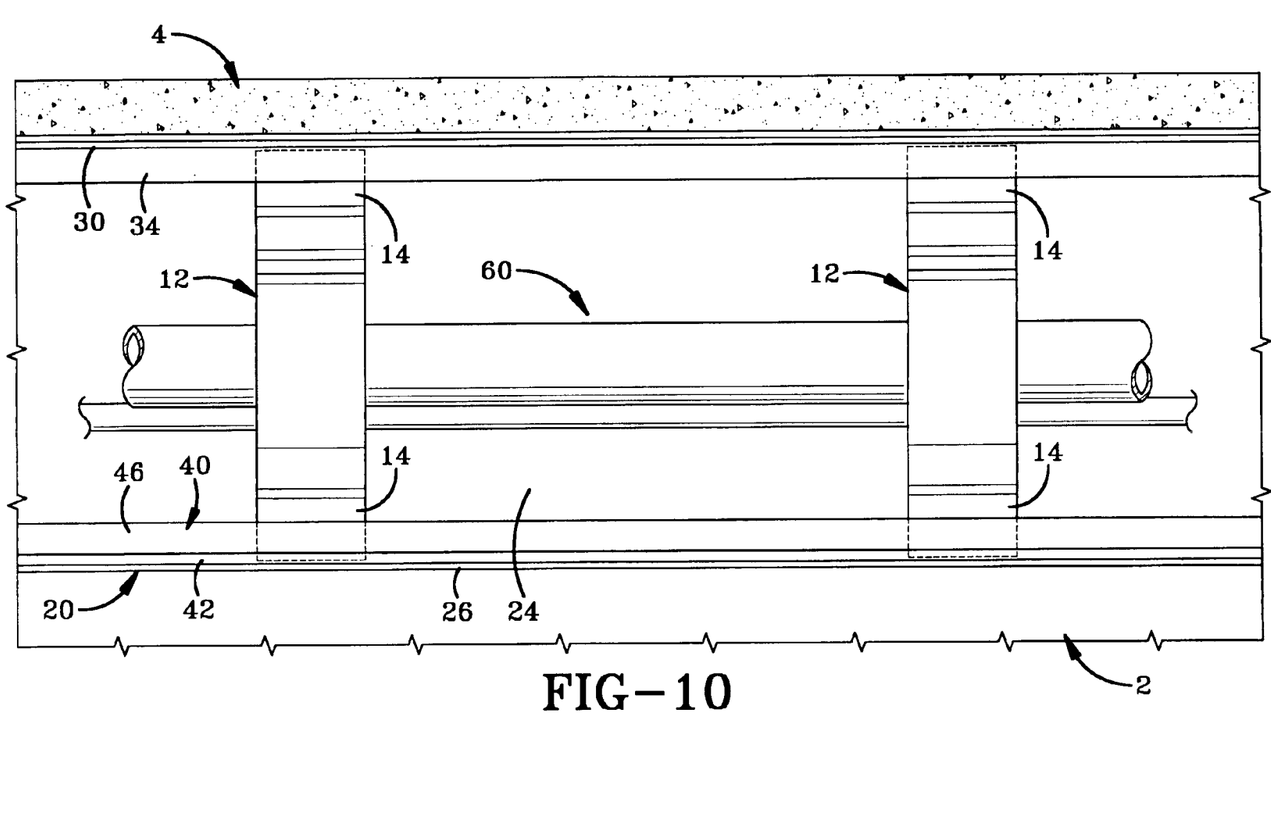
FIG. 10 is a top plan view of the first half of the cover with two clamps installed with tubing and wiring disposed in the clamps.

Clamp 12 is positioned in one of halves 20 or 24 as depicted in FIGS. 5–8. Clamp 12 is first turned at an angle with respect to base wall 24 as depicted in FIGS. 5 and 6. The base of clamp 12 is abutted against the inner surface of base wall 24 such that feet 14 of clamp 24 are adjacent clamp locking flanges 34 and 36. The user then rotates clamp 12 as depicted in FIGS. 7 and 8 so that feet 14 of clamp 12 are positioned under clamp locking flanges 34 and 36. In this position, the longitudinal center line of the opening of clamp 12 is substantially parallel to the longitudinal direction of half 20. The user may then connect half 20 and/or clamp 12 to the wall with appropriate fasteners. It should be noted that clamp 12 does not have to be fastened to the wall because clamp 12 is held in place by clamp locking flanges 34 and 36. Clamp 12 may thus be slid back and forth longitudinally along first half 20 as desired. The user may then position the tubing or wiring 60 in clamp 12 as depicted in FIGS. 9–11. The user may then attach second half 24 to first half 20 as depicted in FIGS. 9 and 11 so that clamps 12 and tubing 60 is covered from view. Second half 24 may be attached to first half 20 with a single fastener as depicted in FIG. 11 when cover 10 is positioned in the corner of a room.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A cover and clamp assembly for covering elongated items; the assembly comprising:
   a cover having an interior area;
   the cover having a pair of opposed locking ledges extending into the interior area;
   each of the locking ledges defining a slot with a portion of the cover;
   a clamp having a pair of opposed feet;
   the cover includes a first half connected to a second half; the first and second halves having identical cross sections with the second half being rotated 180 degrees with respect to the first half;
   each of the slots receiving one of the feet of the clamp to hold the clamp to the cover;
   each half includes a base wall with opposed ends; a sidewall extending substantially perpendicular to the base wall from one of the ends of the base wall; and a flange extending substantially perpendicular to the base wall from the other of the ends of the base wall;
   a locking channel extends from the sidewall of each half; and
   one of the locking channels cooperating with one of the flanges to connect the halves together.

2. The assembly of claim 1, further comprising a fastener extending through the sidewall of the first half, the flange of the second half, and the locking channel of the first half to connect the first half to the second half.

3. A cover and clamp assembly for covering elongated items; the assembly comprising:
   a cover having an interior area;
   the cover having a pair of opposed locking ledges extending into the interior area;
   each of the locking ledges defining a slot with a portion of the cover;
   a clamp having a pair of opposed feet;
   the cover including a first half connected to a second half; the first and second halves having identical cross sections with the second half being rotated 180 degrees with respect to the first half;
   each of the slots receiving one of the feet of the clamp to hold the clamp to the cover;
   each half including a base wall with opposed ends; a sidewall extending substantially perpendicular to the base wall from one of the ends of the base wall; and a flange extending substantially perpendicular to the base wall from the other of the ends of the base wall;
   a locking channel extending from the sidewall of each half; and
   one of the locking ledges abutting the locking channel when the first half is connected to the second half.

4. A cover and clamp assembly for covering elongated items; the assembly comprising:
   a cover having identical first and second halves that define an interior area;
   the cover having a pair of opposed locking ledges extending into the interior area;
   each of the locking ledges defining a slot with a portion of the cover;
   a clamp having a pair of opposed feet;
   each of the slots receiving one of the feet of the clamp to hold the clamp to the first half of the cover;
   each half includes a base wall with opposed ends; a sidewall extending substantially perpendicular to the base wall from one of the ends of the base wall; and a flange extending substantially perpendicular to the base wall from the other of the ends of the base wall;
   the flange of the first half being connected to the sidewall of the second half; and
   the sidewall of the first half being connected to the flange of the second half.

5. The assembly of claim 4, wherein a locking channel extends from the sidewall of each half; and the locking channel cooperating with the flange to connect the halves together.

6. The assembly of claim 5, further comprising a fastener extending through the sidewall of the first half, the flange of the second half; and the locking channel of the first half to connect the first half to the second half.

7. The assembly of claim 6, wherein one of the locking ledges abuts the locking channel when the first half is connected to the second half.

8. A cover and clamp assembly for covering elongated items; the assembly comprising:

a cover having first and second halves that define an interior area; the first and second halves having identical cross sections with the second half being rotated 180 degrees with respect to the first half;

the cover having a pair of opposed locking ledges extending into the interior area;

each of the locking ledges defining a slot with a portion of the cover; a clamp having a pair of opposed feet;

each of the slots frictionally receiving one of the feet of the clamp to hold the clamp to the first half of the cover;

each half includes a base wall with opposed ends; a sidewall extending substantially perpendicular to the base wall from one of the ends of the base wall; and a flange extending substantially perpendicular to the base wall from the other of the ends of the base wall;

the flange of the first half being connected to the sidewall of the second half; and the sidewall of the first half being connected to the flange of the second half.

9. A cover and clamp assembly for covering elongated items; the assembly comprising:

a cover having an interior area;

the cover having a pair of opposed locking ledges extending into the interior area;

each of the locking ledges defining a slot with a portion of the cover;

a clamp having a pair of opposed feet;

the cover including a first half connected to a second half; the first and second halves having identical cross sections with the second half being rotated 180 degrees with respect to the first half;

each of the slots receiving one of the feet of the clamp to hold the clamp to the cover;

each half including a base wall with opposed ends; a sidewall extending substantially perpendicular to the base wall from one of the ends of the base wall; and a flange extending substantially perpendicular to the base wall from the other of the ends of the base wall; and the sidewall of the first half is connected to the flange of the second half.

10. The assembly of claim 9, wherein a locking channel extends from the sidewall of each half.

11. The assembly of claim 9, wherein the flange of the first half is connected to the sidewall of the second half.

* * * * *